July 8, 1941.   R. S. TAYLOR   2,248,138
SPEED CHANGE AXLE
Filed July 5, 1939   2 Sheets-Sheet 1

INVENTOR
ROBERT S. TAYLOR
BY
HIS ATTORNEY

July 8, 1941.  R. S. TAYLOR  2,248,138
SPEED CHANGE AXLE
Filed July 5, 1939  2 Sheets-Sheet 2
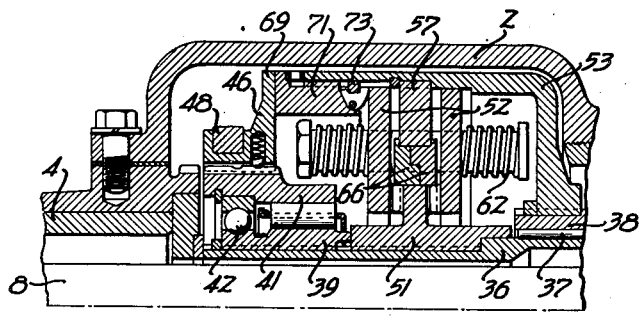
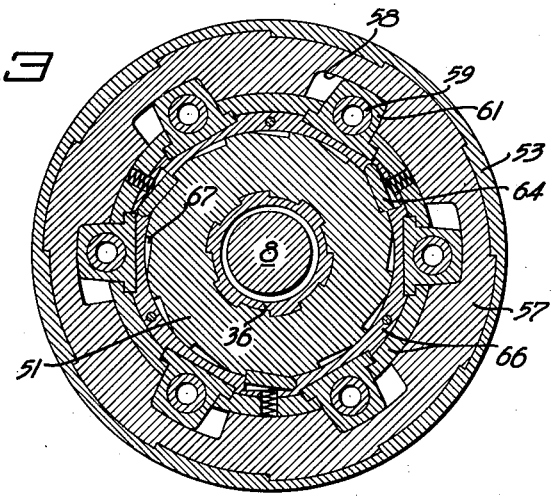
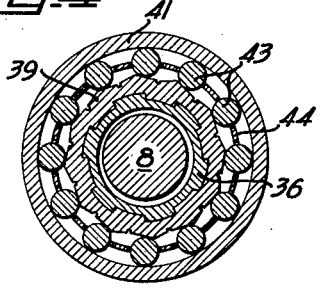
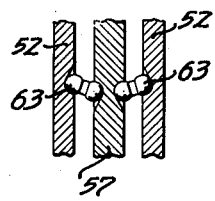
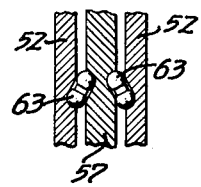
INVENTOR
ROBERT S. TAYLOR
BY
HIS ATTORNEY Patented July 8, 1941

2,248,138

UNITED STATES PATENT OFFICE 2,248,138

SPEED CHANGE AXLE

Robert S. Taylor, Seattle, Wash.

Application July 5, 1939, Serial No. 282,880

21 Claims. (Cl. 74—314)

My invention relates to a speed change mechanism embodied in the rear axle of an automobile; and more particularly an automatic underdrive for an axle.

It is among the objects of my invention to provide a torque controlled underdrive gearing.

Another object is to provide a planetary gear system associated with the differential gearing of the axle in such a way that an underdrive connection is made when a part of the planetary system is held against rotation, and a direct drive connection is made when the parts of the system are locked together.

Another object is to provide a clutch between parts of the planetary system, engageable to lock the parts together upon relative rotation between the parts, and disengageable under torque to release the locked parts.

A further object is to provide a planetary system of the character described in which a part is held against rotation by means including a one-way brake.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claims.

Referring to the drawings:

Figure 2 is a fragmentary axial view showing parts in another operative position.

Figure 3 is a transverse sectional view through the torque clutch, taken in a plane indicated by line 3—3 of Figure 1; and Figure 4 is a similar view through the one-way brake, taken in a plane indicated by line 4—4 of Figure 1.

Figures 5 and 6 are fragmentary sectional views showing a torque clutch toggle in extended and retracted position, taken in a plane indicated by line 5—5 of Figure 1.

Figure 1:
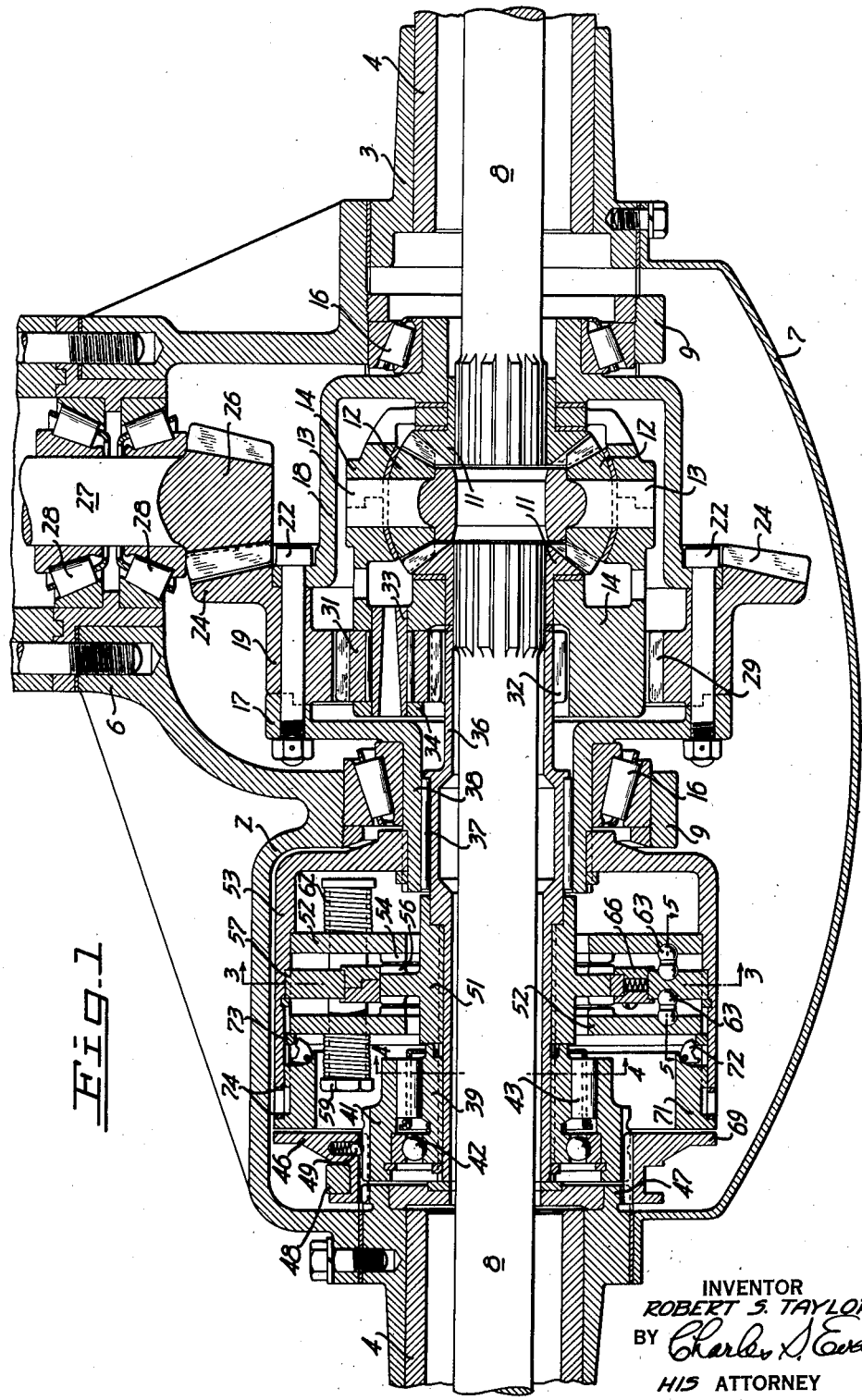
Figure 1 is an axial sectional view of a speed change axle embodying the improvements of my invention.

In terms of broad inclusion, the mechanism embodying my invention comprises a differential gearing; a speed change system associated with the gearing; and means for automatically changing the speed ratios in the system. The speed change system preferably comprises a planetary gearing, and the different speed ratios are produced by either holding a part of the planetary system against rotation, or by locking the parts of the system together for rotation as a unit. My mechanism is preferably embodied in an axle; and the planetary system is arranged to provide an underdrive when one of its parts is being held, and a direct drive when the parts are locked together. The changes between underdrive and direct drive are preferably accomplished by a clutch interposed between parts of the planetary system, engageable by relative rotation between the parts of the system to lock the latter together, and disengageable by torque to release the parts. Upon disengagement of this torque clutch, a part of the planetary system is automatically held against rotation by means including a one-way brake connected between the part to be held and a fixed element.

In greater detail, and referring to the drawings, the speed change mechanism of my invention as embodied in a rear axle of an automobile comprises a housing section 2 mounted on the inner side of a differential housing 3 connected with axle tubes 4. Housing section 2 has a neck 6, with which the torque tube connects; and the other side of the differential housing is covered by a plate 7 in the usual manner.

Axle shafts 8 extend into housing 3 and project through yokes 9 formed on housing section 2. The shafts are connected by a differential gearing comprising gears 11 mounted on the ends of the coaxial shafts, and differential pinions 12 journaled on spider shafts 13. The differential gears are enclosed by a casing 14 journaled on the hubs of gears 11 and providing support for the ends of spider shafts 13.

A rotor is also provided in the housing for enclosing the inner gear assembly, and is journaled in main bearings 16 carried by supporting yokes 9. The rotor comprises end bell sections 17 and 18 journaled directly in the bearings, and an intermediate section 19 fastened between the end sections by suitable bolts 22. Section 19 of the rotor carries an integral master gear 24 which meshes with driving pinion 26 on drive shaft 27 journaled in bearings 28 in neck 6.

A planetary gear system is also arranged in the housing to provide the speed change gearing, and comprises an orbit gear 29, planet gear 31 and sun gear 32. In the underdrive axle illustrated, orbit gear 29 is formed integrally with rotor section 19, and planet gear 31 is journaled on a shaft 33 mounted on differential casing 14; the pinion shaft being supported at its outer end by a spider ring 34 formed as part of the differential casing. Sun gear 32 surrounds one of the axle shafts 8, and is formed as part of a sleeve 36 also encircling the shaft and journaled in a bearing 37 in neck 38 of rotor section 17.

The orbit gear is thus driven by master gear 24, and when sun gear 32 is held against rotation pinion 31 planetates about it to drive its shaft 33 and the connected differential casing 14 slower than the master gear, thus providing an underdrive for the axle.

Means are provided for holding the sun gear against rotation in the underdrive combination. For this purpose a one-way brake is arranged with its inner ring 39 splined on the end of sun gear sleeve 36 and its outer ring 41 journaled on the inner brake ring on a bearing 42. As shown in Figure 4, a series of brake rollers 43 are arranged between the rings and are urged counterclockwise by a spring turned cage 44.

Outer ring 41 of the one-way brake is normally anchored to the housing by a manually shiftable member 46 slidably splined on the ring and engageable with suitable teeth on a fixed element 47. A shifting yoke 48 on member 46 is suitably connected with a lever in the driver's compartment; and a spring pressed ball 49 is provided to hold the member in selected position.

Considering that the vehicle is being driven in a forward speed, the master gear will rotate counterclockwise as viewed from the left in Figure 1, causing pinion 31 to rotate counterclockwise about its own axis and put a clockwise torque on the sun gear. If the one-way brake is connected to the fixed element at this time, as shown in Figure 1, the sun gear is held against clockwise rotation and pinion 31 is forced to planetate counterclockwise about the sun gear, thereby underdriving the differential casing.

Means are provided for locking the gears of the planetary system together for rotation as a unit when the differential casing 14 tends to overrun the speed at which it is being driven; it being understood that when the parts of the planetary system are locked together the differential casing and master gear are connected for unitary rotation, thus giving a higher speed than the reduction through underdrive.

When the differential casing and connected pinion shaft tend to overrun the orbit gear counterclockwise as viewed from the left in Figure 1, the pinion 31 reverses its rotation about its own axis and starts to turn clockwise. This puts a reverse torque on the sun gear, causing it to turn counterclockwise, which the sun gear is free to do because the one-way brake does not prevent it. This tendency of the sun gear to run counterclockwise under these conditions is utilized to lock up the parts of the planetary system for direct drive.

As shown in Figures 1 and 3, an automatic clutch is interposed between the sun and orbit gears, and comprises a central element 51 splined on sun gear sleeve 36 between a pair of clutch plates 52 slidably mounted within a cup-shaped rotor section 53 fixed on the neck portion of rotor section 17. Plates 52 are ring-shaped and each has an annular series of teeth 54 adapted to mesh with complementary teeth 56 on central clutch element 51. Clutch plates 52 are mounted for movement toward and away from each other for engaging and disengaging the central clutch element, and also have a limited degree of rotational movement relative to rotor 53 to insure smooth meshing of teeth 54 and 56 and to provide means for spreading and collapsing the plates.

Mounting of plates 52 is provided by a center ring 57 fixedly splined in cup 53. This ring is notched interiorly at 58 to receive bolts 59 extending through the clutch plates. See Figure 3. These notches thus limit relative rotational movement between the plates and cup, and blocks 61 are arranged on bolts 59 for slidably engaging the notches. As shown in Figures 1 and 2, plates 52 are urged together and into engagement with clutch element 51 by compression springs 62 on the ends of bolts 59.

A series of toggle links 63 are pivotally arranged between the clutch plates and center ring 57 to effect inward and outward movement of the plates upon relative turning movement between the latter and center ring 57. These toggle links are short, round nosed pieces seated in sockets in opposing faces of the clutch plates and center ring. The toggles are collapsed to engage the clutch when sun gear 32 turns counterclockwise as viewed from the left in Figure 1; this counterclockwise rotational movement being transmitted through central element 51 to plates 52 by a series of spring pressed ratchets 64 mounted between the halves of a split cage 66 and engaging ratchet teeth 67 on central clutch element 51. Slide blocks 61 of bolts 59 are fixedly mounted on the cage, as shown in Figure 3, so that when the cage is turned by the ratchets the clutch plates 52 are also turned. The ratchets are designed to permit free rotation of element 51 clockwise as viewed in Figure 2, and to lock plates 52 with element 51 when the latter tends to rotate counterclockwise. Upon collapse of toggles 63 the clutch is engaged to fix the sun gear to the orbit gear, thereby locking the parts of the planetary system together in the direct drive relationship. The high speed direct drive connection will then be maintained as long as clutch 51—52 remains engaged.

Torque means are provided for disengaging clutch 51—52 to shift back into underdrive when the load on the engine becomes too great. This is accomplished by the tendency of toggles 63 to extend and disengage the clutch when the torque between the parts exceeds a predetermined value. It is undertsood that in direct drive connection the driving thrust is applied counterclockwise on plates 52 of the torque clutch as viewed from the left in Figure 1, and the reaction of the load puts a clockwise torque on the central element 52. The torque relationship between the parts thus tends to extend the toggles against the action of springs 62, and the strength of the springs is designed to hold the torque clutch closed until the load conditions make it desirable to drop into underdrive. Upon extension of toggles 63 and consequent opening of the torque clutch, the parts of the planetary system are freed for planetary operation and one-way brake 39—41 immediately engages to hold the sun gear against rotation, as already described in the underdrive connection.

Figures 5 and 6 show toggles 63 in extended and collapsed positions. Figure 5 shows that the toggle is carried over center in the extended position, so as to resist too easy collapsing of the toggle. The same effect could be secured by providing tangent springs bearing against blocks 61 to resist collapsing of the toggles.

Means are also preferably provided for manually locking the axle in direct drive, to prevent the mechanism from shifting automatically into underdrive. Shiftable member 46 is utilized for this purpose, and has a flange 69 adapted to apply pressure to a sleeve 71 slidable axially in the end of rotor cup 53. A plurality of notched latches 72 are pivoted on the inner end of sleeve 71, and when the sleeve is out, as shown in Figure 1, the latches lie out of the way on the rim of a retaining ring 73. When member 46 is shifted to the right the sleeve 71 is pushed in and latches 72 straddle retaining ring 73 to lock clutch plate 52 against outward movement as shown in Figure 2. This holds the torque clutch against disengagement, thereby locking the axle in direct drive. A marcel spring 74 is interposed between sleeve 71 and the end of cup 53 to push the sleeve back out when member 46 is again shifted to the left. It is to be noted that the one-way brake is disengaged from the fixed element whenever the mechanism is locked in direct drive.

*Operation.*—Consider that shiftable member 46 is engaged with fixed element 47 and that clutch plates 52 are disengaged, as shown in Figure 1. Under these conditions the parts of the planetary system are free for planetary operation and orbit gear 29 in the forward speeds drives differential casing 14 counterclockwise through planet pinion 31 as viewed from the left in Figure 1. At this time sun gear 32 tends to turn clockwise and is prevented from doing so by one-way brake rollers 43. The pinion 31 therefore planetates about the fixed sun gear to give the underdrive. It is also to be noted that at this time the outer parts of the torque clutch (plates 52, ring 57 and cage 66) are free to turn counterclockwise because ratchets 64 are designed to allow relative movement in this direction.

When the momentum of the car causes the differential casing to overrun the speed at which it is being driven, the planet pinion 31 tends to reverse its direction of rotation about its own axis, thus tending to turn the sun gear counterclockwise. This counterclockwise rotation is transmitted to clutch plates 52 through ratchets 64, thereby collapsing the toggles and engaging the torque clutch to lock the parts of the planetary system together for rotation as a unit. The differential casing is then driven at the same speed as the master gear, giving the direct drive which is a higher speed ratio than that provided in the underdrive connection. One-way brake rollers 43 do not interfere with the direct drive connection because the sun gear is free to run counterclockwise.

In direct drive, the driving thrust is transmitted through the torque clutch, and clutch plates 52 tend to lag behind center ring 57 thus causing the toggles to try to open up to disengage the clutch. Considerable torque is necessary to do this, because the angle between the collapsed toggle links is small and a relatively great force is necessary to extend them against springs 62. The clutch releasing torque is calculated to drop the axle back into underdrive when the driving effort of the motor becomes too great.

I claim:

1. A speed change mechanism comprising a differential gearing having a differential casing, a planetary gear system including orbit, planet and sun gears, said planet gear being mounted on the differential casing, means for driving the orbit gear, means for holding the sun gear against rotation, and torque controlled means for locking parts of the planetary system together.

2. A speed change mechanism comprising a differential gearing having a differential casing, a planetary gear system including orbit, planet and sun gears, said planet gear being drivably connected with the differential casing, means for driving the orbit gear, means for holding the sun gear against rotation, and torque controlled means for locking the sun gear to the orbit gear.

3. A speed change mechanism comprising a differential gearing having a differential casing, a planetary gear system including orbit, planet and sun gears, said planet gear being drivably connected with the differential casing, means for driving the orbit gear, means for holding the sun gear against rotation, means responsive to relative rotation between parts of the planetary system for locking said parts together, and torque means for disengaging the locking means to release said locked parts.

4. A speed change mechanism comprising a differential gearing having a differential casing, a planetary gear system including orbit, planet and sun gears, said planet gear being drivably connected with the differential casing, means for driving the orbit gear, means for locking parts of the planetary system together, torque means for disengaging the locking means to release said locked parts, and means including a one-way brake for holding the sun gear against rotation upon release of said locked parts.

5. A speed change mechanism comprising a differential gearing, a planetary gear system associated with said differential gearing, means for holding a part of the planetary system against rotation, means for locking parts of the planetary system together, torque means for operating one of said means, and manually controlled means for holding the latter means against operation by said torque means.

6. A speed change mechanism comprising a differential gearing, a planetary gear system associated with said differential gearing, means for locking parts of the planetary system together, torque means for disengaging the locking means to release said locked parts, and manually controlled means for holding the locking means against disengagement by said torque means.

7. A speed change mechanism comprising a differential gearing, a planetary gear system associated with said differential gearing, a torque controlled clutch for locking parts of the planetary system together, and manually controlled means for holding the clutch against disengagement.

8. A speed change mechanism comprising a differential gearing, a planetary gear system associated with said differential gearing, a fixed element, a one-way brake connected to a part of the planetary system, a clutch for locking parts of said system together, and means for optionally connecting the one-way brake to the fixed element or for holding the clutch against disengagement.

9. A speed change mechanism comprising a differential gearing having a differential casing, a planetary gear system including orbit, planet and sun gears, said planet gear being drivably connected with the differential casing, means for driving the orbit gear, means operable to hold the sun gear against rotation upon tendency of the sun gear to rotate in one direction, and means operable to lock parts of the planetary system together upon rotation of the sun gear in the opposite direction.

10. A speed change mechanism comprising a differential gearing having a differential casing, a planetary gear system including orbit, planet and sun gears, said planet gear being drivably connected with the differential casing, means for driving the orbit gear, means including a one-way brake for holding the sun gear against rotation upon tendency of the sun gear to rotate in one direction, and a clutch for locking parts of the planetary system together upon rotation of the sun gear in the opposite direction.

11. A speed change mechanism comprising a differential gearing having a differential casing, a planetary gear system including orbit, planet and sun gears, said planet gear being drivably connected with the differential casing, means for driving the orbit gear, means including a one-way brake for holding the sun gear against rotation upon tendency of the sun gear to rotate in one direction, a clutch for locking parts of the planetary system together upon rotation of the sun gear in the opposite direction, and means for disengaging the clutch when the torque between said parts exceeds a predetermined value.

12. A speed change axle comprising a differential gearing having a differential casing, a planetary gear system having a planet gear carried by said casing, and means for locking parts of the planetary system together and operable under torque to release said parts.

13. A speed change axle comprising a differential gearing having a differential casing, a planetary gear system drivably connected with said casing and having a sun gear, means for locking parts of the planetary system together and operable under torque to release said parts, and means for holding the sun gear of the planetary system against rotation.

14. A speed change axle comprising a differential gearing having a differential casing, a planetary gear system drivably connected with said casing, and means interposed between and responsive to relative turning movement between parts of the planetary system for locking said parts together and operable under torque to release said parts.

15. A speed change axle comprising a differential gearing having a differential casing, a planetary gear system drivably connected with said casing and having orbit, planet and sun gears, means responsive to relative turning movement between the sun and orbit gears for locking said gears together and operable under torque to release said gears, and means for holding the sun gear of the planetary system against rotation in one direction.

16. A speed change axle comprising a differential gearing having a differential casing, a planetary gear system drivably connected with said casing, means for locking parts of the planetary system together and operable under torque to release said parts, and means for holding said locking means against torque release.

17. A speed change axle comprising a differential gearing having a differential casing, a planetary gear system drivably connected with said casing, means including a pair of interengageable elements for locking parts of the planetary system together and disengageable under torque to release said parts, and means for holding the clutch elements against disengagement.

18. A speed change mechanism comprising a planetary gear system, an element connected for rotation with a part of said system, a second element interengageable with said first element, torque means for disengaging said elements and operable to hold the elements disengaged, and means bearing against one of the elements to hold the latter against disengagement by said torque means.

19. A speed change mechanism comprising a planetary gear system, a clutch interposed between parts of said system and having toothed elements for locking the parts together, torque means for disengaging the clutch and operable to hold the clutch teeth disengaged, and means for locking the clutch against disengagement by said torque means.

20. A speed change mechanism comprising a differential gearing having a differential casing, a planetary gear system having a planet gear drivably connected withe the differential casing, means operable upon turning of a part of said system for holding said part against rotation, and means operable upon relative turning between parts of the system for locking the parts of said system together.

21. In a speed change gearing, a planetary gear system, a clutch for locking parts of the system together, a fixed element, means including a one-way brake interposed between a part of said system and the fixed element for holding said part against rotation in one direction, and means for disconnecting the brake to permit rotation of said last mentioned part in either direction.

ROBERT S. TAYLOR.